United States Patent
Faga et al.

(10) Patent No.: US 11,772,725 B2
(45) Date of Patent: Oct. 3, 2023

(54) MANUFACTURING PROCESS FOR ELECTRIC VEHICLE PLATFORM

(71) Applicant: Canoo Technologies Inc., Torrance, CA (US)

(72) Inventors: Frank Faga, Torrance, CA (US); Ulrich Kranz, Torrance, CA (US); Steven Offutt, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 78 days.

(21) Appl. No.: 17/405,908

(22) Filed: Aug. 18, 2021

(65) Prior Publication Data
US 2022/0055701 A1    Feb. 24, 2022

Related U.S. Application Data

(60) Provisional application No. 63/067,202, filed on Aug. 18, 2020.

(51) Int. Cl.
*B62D 65/04* (2006.01)
*B60K 1/04* (2019.01)
(Continued)

(52) U.S. Cl.
CPC .............. *B62D 65/04* (2013.01); *B60K 1/04* (2013.01); *B62D 29/043* (2013.01);
(Continued)

(58) Field of Classification Search
CPC .... B62D 65/04; B62D 29/043; B62D 63/025; B62D 65/14; B62D 65/16; B60K 1/04;
(Continued)

(56) References Cited

U.S. PATENT DOCUMENTS

| 6,109,424 | A | * | 8/2000 | Doan | B62D 65/02 |
| | | | | | 29/430 |
| 6,131,284 | A | * | 10/2000 | Basler | B62D 65/04 |
| | | | | | 29/458 |

(Continued)

FOREIGN PATENT DOCUMENTS

WO    1999012798 A1    3/1999

OTHER PUBLICATIONS

International Search Report and Written Opinion of the International Searching Authority dated Mar. 4, 2022, in connection with International Application No. PCT/US2021/046563, 14 pages.

*Primary Examiner* — Sarang Afzali
*Assistant Examiner* — Darrell C Ford

(57) ABSTRACT

Processes for producing an electric vehicle include manufacture of a lower body skateboard platform including at least energy storage/conversion (batteries within a ladder frame), propulsion, suspension and wheels, steering, crash protection, and braking, and manufacture of a top hat upper portion including at least the vehicle cabin housing various interior components such as passenger seats, frame covers, and a roof headliner, together with steering and acceleration controls. The upper body portion and the lower body platform are manufactured separately in parallel and then merged, which allows for ease of manufacture and a more compact design.

14 Claims, 9 Drawing Sheets

(51) Int. Cl.
*B62D 65/14* (2006.01)
*B62D 65/16* (2006.01)
*B62D 63/02* (2006.01)
*B62D 29/04* (2006.01)

(52) U.S. Cl.
CPC ........... *B62D 63/025* (2013.01); *B62D 65/14* (2013.01); *B62D 65/16* (2013.01); *B60K 2001/0438* (2013.01)

(58) Field of Classification Search
CPC ....... B60K 2001/0438; Y10T 29/49828; Y10T 29/49829; Y10T 29/49831
See application file for complete search history.

(56) References Cited

U.S. PATENT DOCUMENTS

| | | | |
|---|---|---|---|
| 6,511,120 B1 | 1/2003 | Mitts | |
| 8,229,586 B2 * | 7/2012 | Wallace | B23P 19/042 700/114 |
| 2003/0037967 A1 * | 2/2003 | Chernoff | B60G 13/14 180/65.1 |
| 2003/0038470 A1 | 2/2003 | Chernoff et al. | |
| 2006/0061145 A1 | 3/2006 | Strebe et al. | |
| 2006/0068094 A1 * | 3/2006 | Cole | B05B 16/40 118/308 |
| 2008/0201952 A1 * | 8/2008 | Hedderly | B62D 65/02 29/897.2 |
| 2009/0158579 A1 * | 6/2009 | Climent | B23P 19/06 29/525.11 |
| 2009/0223739 A1 | 9/2009 | Duffin et al. | |
| 2013/0334839 A1 * | 12/2013 | Grevener | B62D 63/025 296/193.07 |
| 2015/0190977 A1 | 7/2015 | Lewis et al. | |
| 2017/0001507 A1 | 1/2017 | Ashraf et al. | |
| 2018/0229788 A1 * | 8/2018 | Erlacher | B62D 65/024 |
| 2019/0217695 A1 | 7/2019 | Hofer | |
| 2020/0148292 A1 * | 5/2020 | Hosbach | B62D 65/04 |
| 2021/0091352 A1 | 3/2021 | Weicker et al. | |
| 2021/0122223 A1 | 4/2021 | McCarron et al. | |
| 2021/0178879 A1 * | 6/2021 | Swartzell | B62D 25/2009 |
| 2022/0348275 A1 * | 11/2022 | Harmon | B60K 1/04 |
| 2023/0089208 A1 * | 3/2023 | Xu | B60K 1/04 429/56 |
| 2023/0103246 A1 * | 3/2023 | Inami | B62D 21/17 296/204 |

* cited by examiner

MANUFACTURING PROCESS FOR ELECTRIC VEHICLE PLATFORM

CROSS-REFERENCE TO RELATED APPLICATIONS

This application claims priority to U.S. Provisional Patent Application No. 63/067,202 filed Aug. 18, 2020 and entitled MANUFACTURING PROCESS FOR ELECTRIC VEHICLE PLATFORM. The content of the above-identified patent document(s) is incorporated herein by reference.

TECHNICAL FIELD

This disclosure relates generally to electric vehicle manufacturing processes. More specifically, this disclosure relates to efficient manufacture of an EV designed as a lower platform and upper top hat.

BACKGROUND

Automobile vehicles may generally be described in relation to a body or cabin designed to enclose passengers, and the various electrical, mechanical and structural systems, subsystems, and components that allow the vehicle to operate. In traditional automobile design, the body and various functional systems and components are inextricably intertwined. For example, mechanical linkages directly interconnect the steering and brake systems between the wheels and the passenger, and elements such as the motor and heating and cooling systems are disposed in a front compartment that extends upward into the body of the vehicle. The traditional vehicle design was once typically body-on-frame (BoF). The most common passenger vehicle design is now unibody, where the frame is integral to the front, main, and rear body subassemblies.

The numerous interconnections between the vehicle body and functional components create a number of manufacturing and design inefficiencies. For example, a change in the motor may necessitate a change in the dimensions of the body. Similarly, altering the passenger compartment to include newly desired features (e.g., altering the vehicle profile or passenger seating position) may require redesign of multiple or even all vehicle functional systems. As a result, a great deal of effort has been made to design generic functional vehicle platforms onto which numerous vehicle bodies ("top hats") may be easily attached without alteration to the components of the vehicle platform itself. For many years, the common practice has been to create common unibody underbodies that function as the platform for numerous top-hats.

SUMMARY

In one embodiment, a process for manufacturing an electric vehicle includes manufacturing an upper body portion, manufacturing a lower body portion, and merging the upper body portion and the lower body portion, where at least a portion of the manufacturing the upper body portion and the manufacturing the lower body portion are performed in parallel. Manufacture of the upper body portion may include: providing an upper body frame; applying wiring harnesses to the upper body frame; applying body panels to the upper body frame; applying doors to the upper body frame; applying fittings to the upper body frame; applying heating, ventilation, and air conditioning (HVAC) ducts and vents to the upper body frame; applying glass to the upper body frame; and applying interior components to the upper body frame. Manufacture of the lower body portion may include: providing a lower body frame; applying a drivetrain to the lower body frame; applying control system to the lower body frame; applying an HVAC system to the lower body frame; applying a drivetrain cooling system to the lower body frame; applying an energy storage system to the lower body frame; and applying an energy storage heating and cooling system to the lower body frame. Merging the upper body portion and the lower body portion may include: mechanically connecting the upper body portion and the lower boy portion; connecting the HVAC system of the lower body portion to the HVAC ducts and vents of the upper body portion; connecting the wiring harnesses of the upper body portion to be in communication to at least one of the drivetrain or the control system of the lower body portion; and vehicle testing.

In another embodiment, manufacturing an electric vehicle includes manufacturing a skateboard platform, manufacturing a top hat, and merging the skateboard platform and the top hat, where the top hat is manufactured as least partially in parallel with the skateboard platform. Manufacture of the top hat may include: providing an upper body frame; applying wiring harnesses to the upper body frame; applying body panels to the upper body frame; applying doors to the upper body frame; applying fittings to the upper body frame; applying heating, ventilation, and air conditioning (HVAC) ducts and vents to the upper body frame; applying glass to the upper body frame; and applying interior components to the upper body frame. Manufacture of the skateboard platform may include: providing a lower body frame; applying a drivetrain to the lower body frame; applying control system to the lower body frame; applying an HVAC system to the lower body frame; applying a drivetrain cooling system to the lower body frame; applying an energy storage system to the lower body frame; and applying an energy storage heating and cooling system to the lower body frame. Merging the skateboard platform and the top hat may include: mechanically connecting the top hat and the skateboard platform; connecting the HVAC system of the skateboard platform to the HVAC ducts and vents of the top hat; connecting one of the wiring harnesses of the top hat to a drivetrain of the skateboard platform and one of the wiring harnesses of the top hat to a control system of the skateboard platform; and vehicle testing.

For either embodiment, the exterior components of the electric vehicle may be formed of colored thermoplastic. The manufacturing process may include e-coating at least one component—including optionally a closure—of the electric vehicle. No paint shop need be utilized in the manufacturing process.

Many embodiments are directed to electric vehicle platforms, their design, methods of manufacture, component systems, and materials.

Various embodiments are directed to a manufacturing process for manufacturing an electric vehicle including:

manufacturing an upper body portion;
 manufacturing a lower body platform; and
 merging the upper body portion and the lower body platform, where manufacturing the upper body portion and the manufacturing the lower body platform is performed in parallel as much as possible to reduce the work-in-progress (WiP).

In various other embodiments, manufacturing the upper body portion includes (not necessarily in the order listed below):

providing an upper body frame;
applying wiring harnesses to the upper body frame;
applying body panels to the upper body frame;
applying doors to the upper body frame;
applying fittings to the upper body frame;
applying heating, ventilation, and air conditioning (HVAC) ducts and vents to the upper body frame;
applying glass to the upper body frame;
applying interior components to the upper body frame; and
performing a coating process to at least one component of the upper body portion.

In still various other embodiments, manufacturing the lower body platform includes (not necessarily in the order listed below):
providing a lower body frame;
applying a drivetrain to the lower body frame;
applying control system to the lower body frame;
applying an HVAC system to the lower body frame;
applying a drivetrain cooling system to the lower body frame;
applying an energy storage system to the lower body frame;
applying an energy storage heating and cooling system to the lower body frame; and
performing a coating process to portions of the lower body platform.

In still various other embodiments, merging the upper body portion and the lower body portion includes (not necessarily in the order listed): mechanically connecting the upper body portion and the lower boy portion; connecting the HVAC system of the lower body platform to the HVAC ducts and vents of the upper body portion; and connecting the wiring harnesses of the upper body portion to be in communication to at least one of the drivetrain or the control system of the lower body platform.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
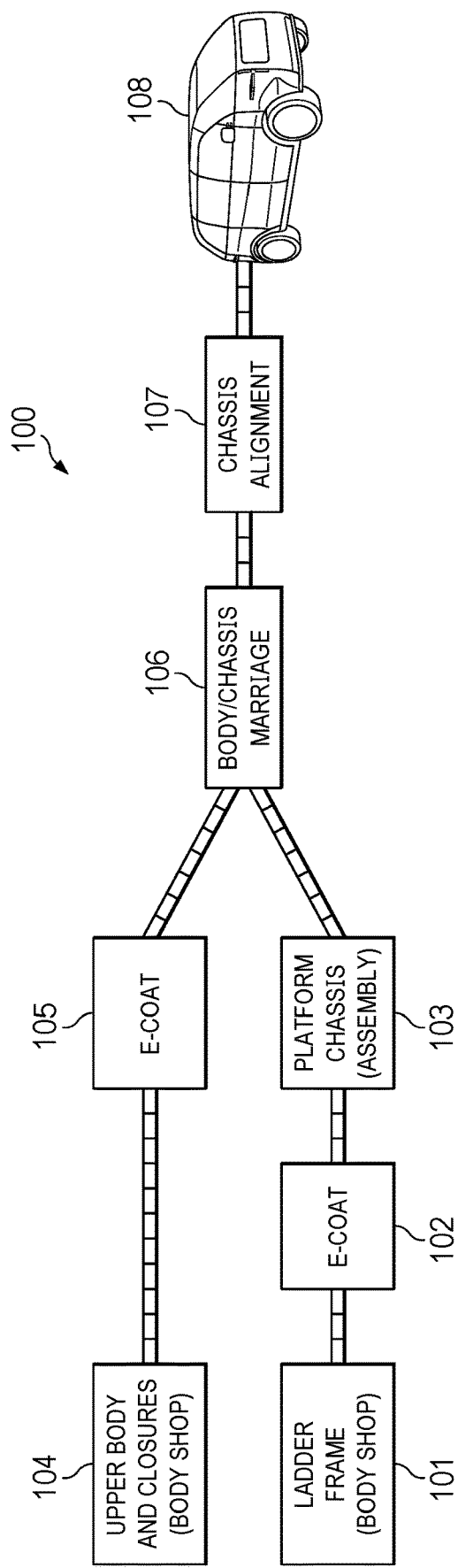
FIG. 1 illustrates, at a high level, EV manufacture according of embodiments of the present disclosure.

FIGS. 1 through 6, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Although BoF and unibody designs have been prevalent in vehicle manufacture, recently designs referred to in the art as "skateboards" are becoming more common. See, for example, U.S. Patent Application Publication No. 2021/0122223 A1, which is incorporated herein by reference. While skateboard designs are used primarily if not exclusively for EVs, most EVs remain modified unibody designs for which components are attached to subframe cradles and the battery mounts underneath the vehicle, as close to the center as possible.

Conventional EVs include a single block, heavy battery that is loaded into a single vehicle frame. By contrast, the EV design in the present disclosure employs a skateboard vehicle platform on which an upper body ("top hat") is mounted, and includes multiple battery elements inside the spaces of a ladder frame. Such a battery configuration is disclosed, for example, in U.S. Patent Application Publication No. 2021/0091352 A1, which is incorporated herein by reference. For the battery configuration described in that publication, the battery cases and the ladder frame provide structure to each other. The conventional EV design with a single, heavy battery limits manufacturing process options since moving the battery and frame along a production line requires specific equipment. With a skateboard platform and ladder frame-mounted battery elements, a manufacturing process of the type described herein may be employed, achieving savings in costs, required manufacture space and operations, and EV weight.

This disclosure relates to an electric vehicle platform including a lower body portion which includes many systems that are used to power, propel, steer, heat and/or cool, and stop the vehicle. The lower body portion is also referred to as the skateboard portion of the vehicle. The lower body portion is mated to an upper body portion which may also be referred to as a top hat portion of the vehicle. Separation of the lower body portion and the upper body portion allows for many advantages such as higher customizability and exchangeability for components within the vehicle. A single design for lower body portion may be used for different vehicle types (e.g., compact, sedan, coupe, sports utility vehicle, sports car, truck, delivery vehicle, etc.) simply by swapping the upper body portion. Further, separation of the lower body portion and the upper body portion allows for many of the manufacturing processes that are performed in manufacturing an electric vehicle to be performed in parallel. Performing processes in parallel allows for better throughput of vehicles. More manufacturing processes can be performed simultaneously which may yield a quicker assembly time per vehicle. Further, spaces within the lower body portion which are typically difficult to access given the presence of the upper body portion may be easier to access which may yield designs for vehicles with tighter space constraints (for example, less area to fit tools into for adding components).

In the present disclosure, an EV manufacturing process entails: (1) no painting, since the skateboard, upper body (or "top hat") and closures are e-coated, while the exterior is constructed of colored thermoplastic; (2) separate build of the skateboard and cabin body in parallel, with the sub-process(es) in the body shop consisting of skateboard, cabin, and closure lines; (2) skateboard assembly from chassis and powertrain, including electrical wiring for the battery; (4)

general assembly line marriage of the skateboard structure to the upper body top hat and installation of wiring, electronics, carpet, trim, seats, exterior, and other components; and (5) final full vehicle testing before completion. As a result, the EV manufacturing process requires body shop and full assembly lines, but no paint shop is needed and flexibility is production volumes is achieved.

FIG. 1 illustrates, at a high level, EV manufacture according of embodiments of the present disclosure. The embodiment shown in FIG. 1 is for illustration and explanation only. FIG. 1 does not limit the scope of this disclosure to any particular implementation of EV manufacture, or exclude variants.

Use of a skateboard platform and ladder-frame mounted battery components facilitates the EV manufacturing process and achieving the benefits described above. The process 100 depicted was deliberately and thoughtfully engineered to leverage a skateboard platform and top hat for efficient manufacturing at high volumes at the highest quality levels. A parallel process reduces manufacturing time significantly and eliminates costly and/or problematic processes such as painting.

The exemplary process 100 includes two parallel lines for the platform and the upper body. The platform line begins at 101 with formation of the ladder frame, which is then e-coated at 102 and assembled with the battery elements and other platform components at 103. The upper body line begins with formation of the upper body and closures at 104, which are then e-coated at 105. The platform (chassis) and upper body are then married at 106, where interior and exterior assembly is completed. At 107, chassis alignment is performed and, at 108, end-of-production testing and any required finishing.

In the exemplary process, no painting is necessary since the skateboard, upper body and closures are e-coated while the exterior is constructed of colored thermoplastic. Separate build of the skateboard and cabin bodies in parallel allows the body shop to proceed with the skateboard platform line together with cabin and closures lines (shown combined at 104 for simplicity). The skateboard platform is assembled from a chassis and powertrain, including electrical wiring for the battery. Like the body or top-hat, the ladder frame and battery elements (in combination) are fused with welding and/or attached to the platform frame with fasteners. A general assembly line will marry the skateboard structure to the upper body top hat at 106 and install wiring, electronics, carpet, trim, seats, exterior, and other components. Final full vehicle testing is performed at 108 before completion.

FIGS. 2A through 2D illustrate EV manufacture according to an embodiment of the present disclosure. The embodiment shown in FIGS. 2A through 2D is for illustration and explanation only. FIGS. 2A through 2D do not limit the scope of this disclosure to any particular implementation of EV manufacture, or exclude variants.

Figure 2A:
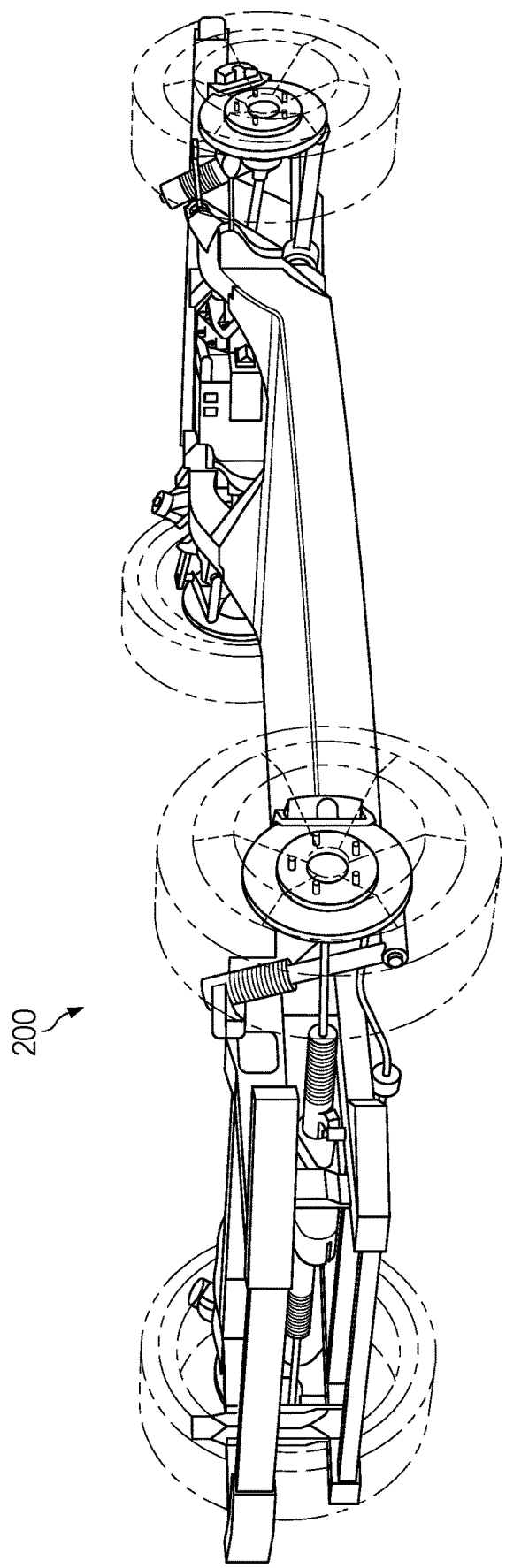
FIGS. 2A, 2B, 2C, and 2D illustrate EV manufacture according to an embodiment of the present disclosure.

FIG. 2A is a perspective view illustrating an exemplary embodiment of a lower body portion 200 (e.g., a skateboard platform) of an EV formed as part of EV manufacture according of embodiments of the present disclosure. In this embodiment, various systems may be placed within the lower body portion 200, such as: one or more drivetrain components (including but not limited to the electric motor, transmission, gear shifters, etc.); one or more energy storage components (e.g., battery components) secured by a ladder frame; one or more heating/cooling system (for cooling the drivetrain components, cooling and heating the energy storage components, etc.); the heating, ventilation, and air conditioning (HVAC, for heating and cooling the vehicle cabin); one or more stopping components (e.g., brake components); and/or one or more steering components (e.g., components capable of controlling alignment of the front and/or rear wheels).

Figure 2B:
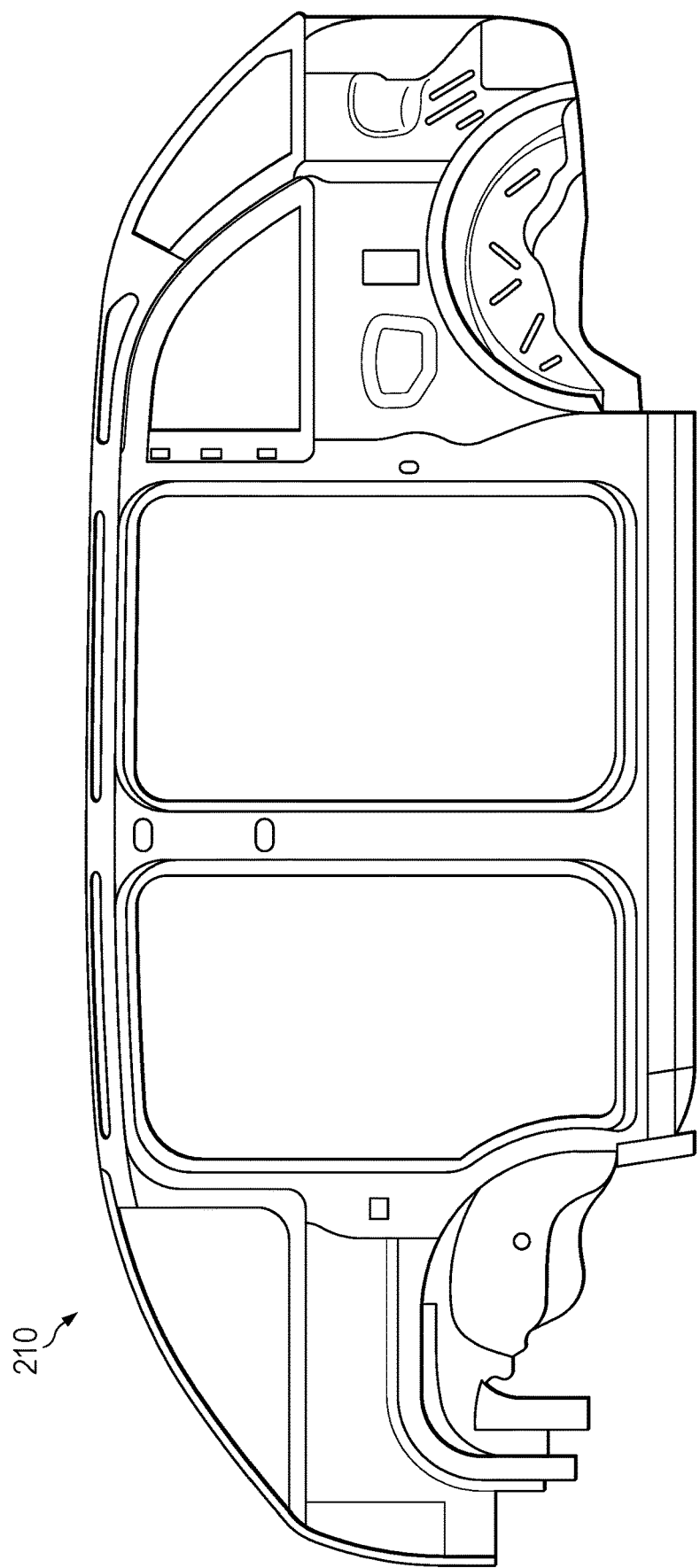

FIG. 2B is a perspective view illustrating an exemplary embodiment of an upper body portion 210 (e.g., a top hat portion) of an EV formed as part of EV manufacture according of embodiments of the present disclosure. The upper body portion 210 may include but is not limited to: wiring harnesses (for connection with the components of the lower body portion 200); body panels, doors and fittings; HVAC ducts and vents; glass or comparably transparent material (e.g., door window glass, windshield, and/or rear window); and interior (e.g., seats, headliner, various compartments). The upper body portion 210 may include a steering wheel and accelerator and brake pedals which interface to the lower body portion 200 steering components, motor, and stopping components through the wiring harness to create a drive-by-wire.

Figure 2C:
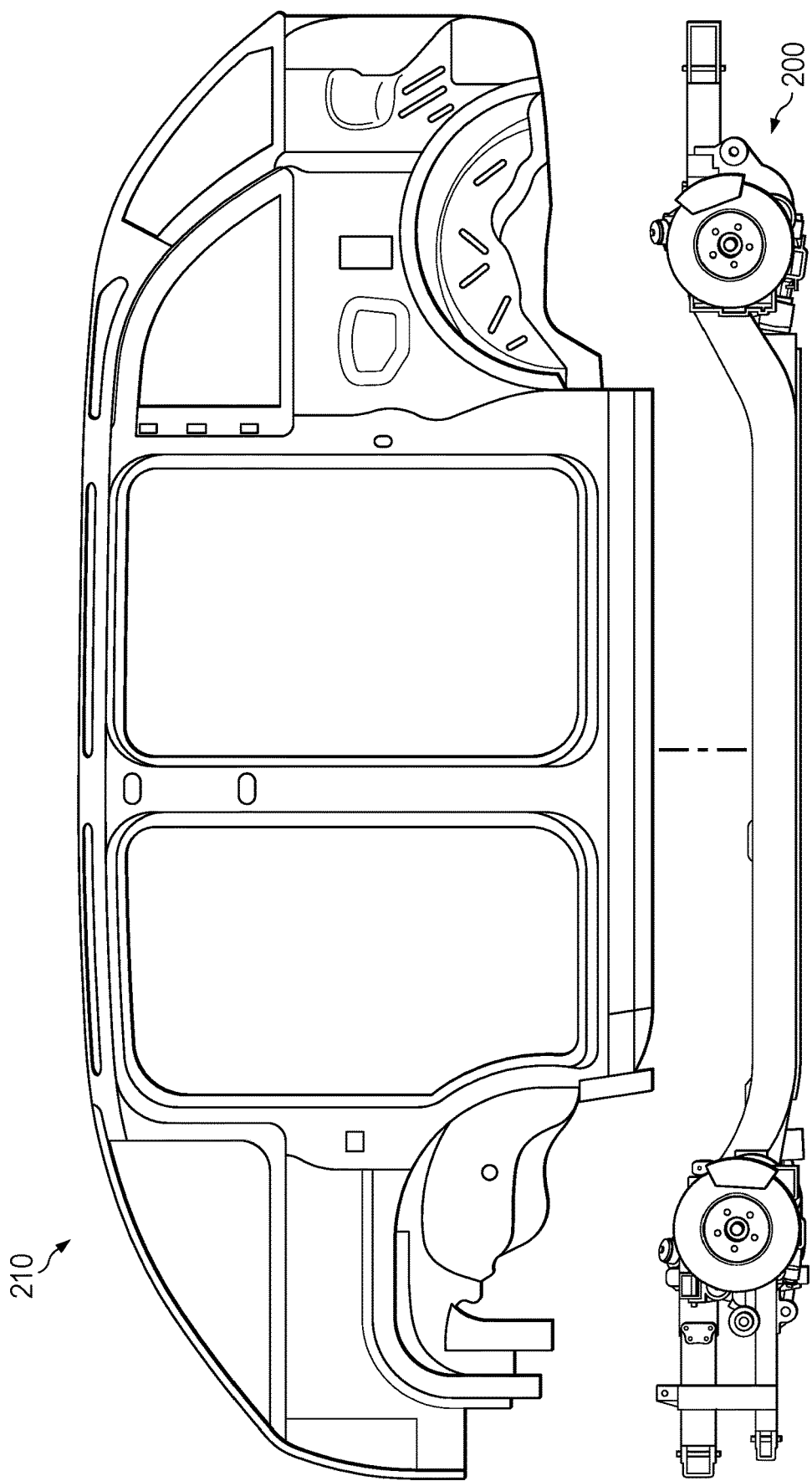
Figure 2D:
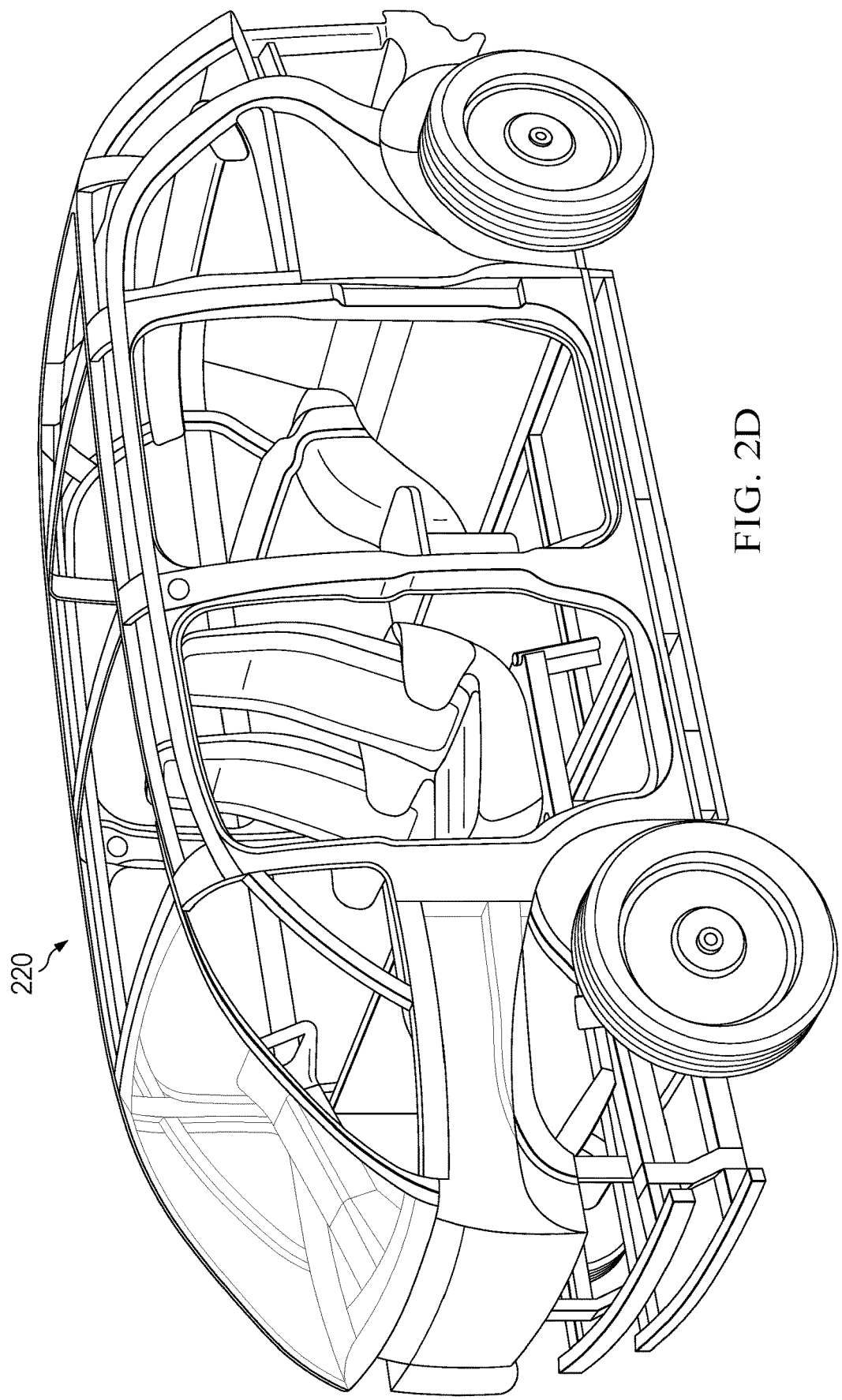

FIG. 2C illustrates an exemplary embodiment of the lower body portion 200 described in connection with FIG. 2A and the upper body portion 210 described in connection with FIG. 2B during merger. The upper body portion 210 is placed above the lower body portion 200. In order to unite or merge the upper body portion 220 and the lower body portion 200, the upper body portion 220 may be lowered upon the lower body portion 200 or the lower body portion 200 may be raised into the upper body portion 220. When merging the upper body portion 220 and the lower body portion 200 (often referred to as a "body drop" or "chassis-marriage"), the wiring harnesses of the upper body portion 220 may be connected to the respective electrical connection of the lower body portion 200. Further, the HVAC system of the lower body portion 200 may be properly connected to the HVAC ducts and vents of the upper body portion 220. Various aspects of this merging process are further described in connection with FIG. 5. FIG. 2D illustrates an exemplary embodiment of a completed vehicle 220 where the lower body portion 200 and the upper body portion 220 were previously merged.

Figure 3:
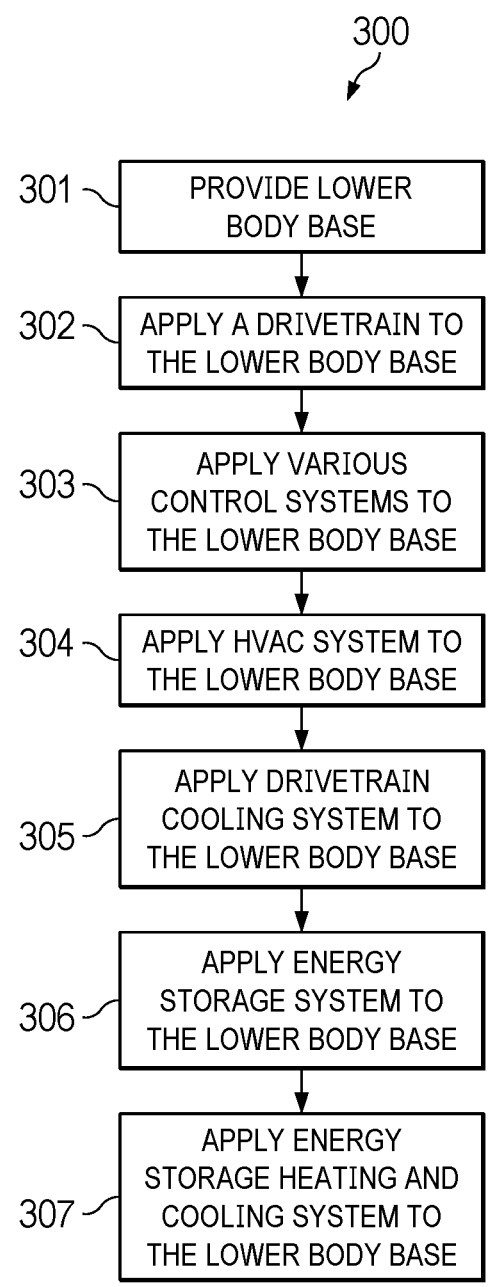
FIG. 3 is a flowchart illustrating an exemplary process for manufacturing the lower body platform described in connection with FIG. 1 and illustrated in FIG. 2A.

FIG. 3 is a flowchart illustrating an exemplary process for manufacturing the lower body platform 200 described in connection with 101 through 103 of FIG. 1 and illustrated in FIG. 2A. The embodiment shown in FIG. 3 is for illustration and explanation only. FIG. 3 does not limit the scope of this disclosure to any particular implementation of lower body platform manufacture, or exclude variants. Further, while the depicted steps are described in a sequence, the steps may be performed in a different order than the sequence illustrated or described.

At step 301 of process 300, there is provided a base for the lower body platform 200, which base may include a frame. The frame may be a single integrally formed piece or multiple segmented components. The components may be a front and rear section along with various cross beams which join the front and rear sections, and may optionally form a ladder. A drivetrain may be applied (step 302) to the base for the lower body platform 200. The drivetrain may include an electric motor and/or a transmission. Various control systems may be applied (step 303) to the base for the lower body platform 200. Those control systems may include braking systems, steering systems, and/or suspension systems. An HVAC system may be applied (step 304) to the base for the lower body platform 200. The HVAC system may include various components such as pumps, condensers, radiators, evaporators, heaters, blowers, fans, fluid reservoirs, and valve and fluid conduits suitable to interlink these components. The HVAC system may include a separate front HVAC system for heating and/or cooling the front of the vehicle cabin and a rear HVAC system for heating and/or cooling the rear of the vehicle cabin. A drivetrain cooling system may be applied (step 305) to the base for the lower body platform 200. The drivetrain cooling system may include a radiator, conduits for flowing coolant, and/or a pump. An energy storage system may be applied (step 306) to the base for the lower body platform 200. The energy storage system may include one or more battery components capable of storing energy for use by the drivetrain, contained within a ladder frame (which may be separate from the frame described above, or integrally formed therewith). An energy storage heating and cooling system may be applied (step 307) to the base for the lower body platform 200. The energy storage heating and cooling system may include a radiator, conduits for flowing coolant, and/or a pump. The HVAC system, the drivetrain cooling system, and the energy storage heating and cooling system may be interconnected to heat and cool various aspects of the systems through moving waste heat from one system to the other. For example, the waste heat from the drivetrain may be used to heat the energy storage system when such heating is desirable.

Many other components may be applied to the base for the lower body platform 200, and thus steps 302 through 307 are mere examples of process steps that may be performed during manufacture of the lower body platform 200, independent of processes that are performed to the upper body portion 210. Many features other than those described above may be added to the lower body platform 200, which may include corresponding manufacturing processes. These features include cameras mounted at various locations on the lower body platform 200 to aid in driver visibility and/or control during vehicle operation. Advantageously, the process for manufacture of the lower body platform 200 may be performed in parallel to the process performed for manufacture of the upper body portion 210 described in connection with FIG. 4.

Figure 4:
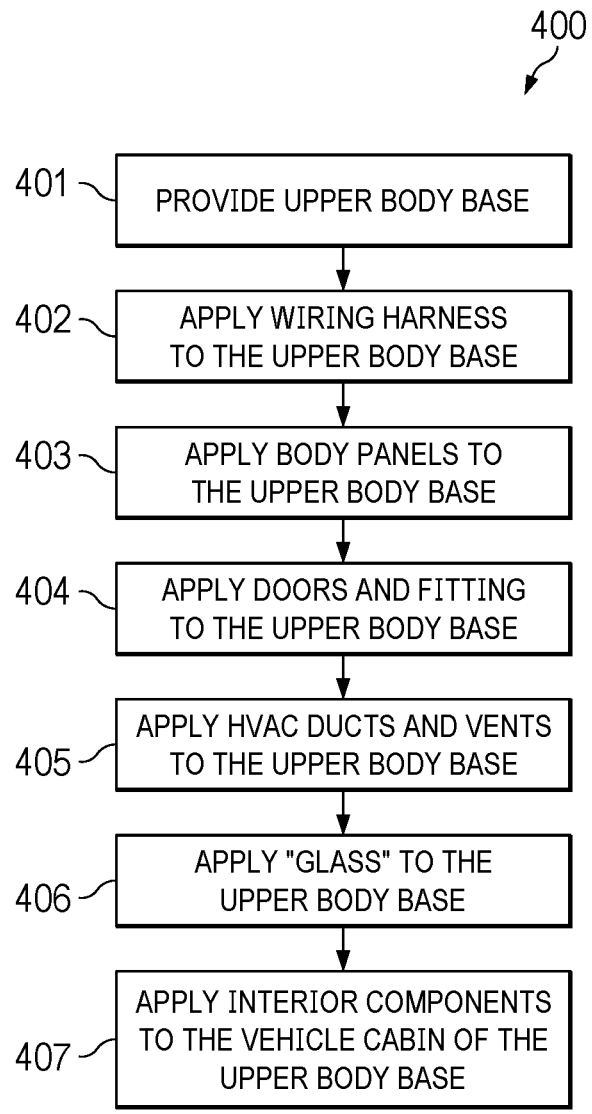
FIG. 4 is a flowchart illustrating an exemplary process for manufacturing the upper body platform described in connection with FIG. 1 and illustrated in FIG. 2B.

FIG. 4 is a flowchart illustrating an exemplary process for manufacturing the upper body platform 210 described in connection with 104 through 105 of FIG. 1 and illustrated in FIG. 2B. The embodiment shown in FIG. 4 is for illustration and explanation only. FIG. 4 does not limit the scope of this disclosure to any particular implementation of lower body platform manufacture, or exclude variants. Further, while the depicted steps are described in a sequence, the steps may be performed in a different order than the sequence illustrated or described.

At step 401 of process 400, there is provided a base for the upper body portion 210, which includes a frame. The frame may be segmented or integral (e.g., a unibody design). The segmented frame may include various pieces such as cross beams which may hold a front and back portion of the upper body portion 210 together. One or more wiring harnesses may be applied (step 402) to the base for the upper body portion 200. The one or more wiring harnesses may be connected to various components such as a steering wheel, pedals, and/or cabin lights in order to provide power and user controllability. Body panels may be applied (step 403) to the base for the upper body portion 210. These body panels may help the aerodynamics of the vehicle and improve aesthetics for the vehicle. Further, the body panels provide crash protection in case of an accident or crash. Doors and fittings may be applied (step 404) to the base for the upper body portion 210. The doors and fittings may include passenger doors and a trunk and handles or levers in order to open and shut the doors. HVAC ducts and vents may be applied (step 405) to the base for the upper body portion 210. The ducts guide the HVAC system around the cabin and the vents input heated or cooled air into the vehicle cabin. "Glass" (e.g., safety glass or a comparable transparent material) may be applied (step 406) to the base for the upper body portion 210. The glass may include passenger windows, a windshield, sunroof, moonroof, and/or rear windshield. One or more interior components may be applied (step 407) to the vehicle cabin of the upper body portion 210. The one or more interior components may include seats, coverings, and/or a roof headliner.

Many other components may be applied to the base for the upper body portion 210 and thus steps 402-407 are mere examples of steps or sub-processes that may be performed to manufacture the upper body portion 210, independent of processes that are performed to manufacture the lower body platform 200. Many other features may be added to the upper body portion 210, which may include corresponding manufacturing processes. For example, a roof rack may be applied to the upper body portion, if this is a desired feature of the vehicle. Advantageously, the processes performed to manufacture the upper body portion 210 may be performed in parallel to the processes performed to manufacture the lower body platform 200 described in connection with FIG. 3.

Figure 5:
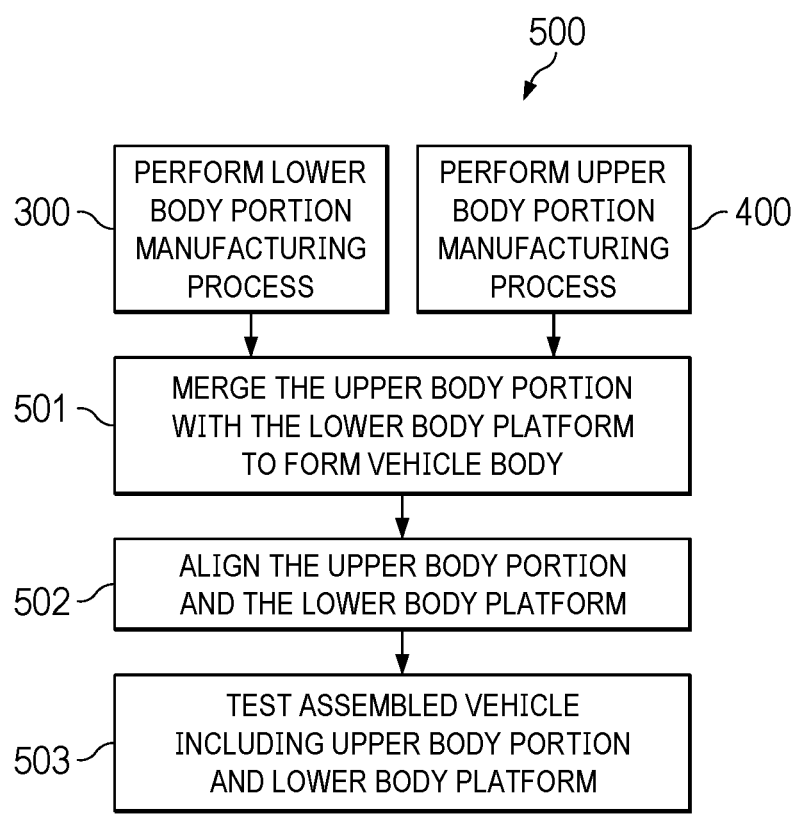
FIG. 5 is a flowchart illustrating an exemplary process for assembling a completed electric vehicle as described in connection with FIG. 1 and depicted in FIG. 2D.

FIG. 5 is a flowchart illustrating an exemplary process for assembling a completed electric vehicle 220 as described in connection with 106 through 108 in FIG. 1 and depicted in FIG. 2D. Step 300 of process 500 is the process described in connection with FIG. 3 and step 400 is the process described in connection with FIG. 4. The lower body platform 200 and the upper body portion 210 are merged (step 501) together. In this step, the wiring harnesses from the upper body portion 210 are connected with the corresponding systems of the lower body platform 200. Also, the HVAC ducts and vents of the upper body portion 210 are connected with the HVAC system of the lower body platform 200. Further, the upper body portion 210 and the lower body platform 200 may be mechanically connected through fasteners and/or welding. The upper body portion 210 and the lower body platform 200 are specifically adapted to be conveniently merged. The upper body portion 210 may include various structural portions which provide the upper body portion 210 rigidity during manufacturing, and which may be removed prior to merging with the lower body platform 200. Advantageously, manufacturing the upper body portion 210 and the lower body platform 200 may be performed in parallel with one another, which may provide better throughput during manufacture while allowing for a more streamlined manufacturing process. Further, manufacturing the upper body portion 210 and the lower body platform 200 separately allows for ease of access of the components within the upper body portion 210 and the lower body platform 200, which may allow for a more compact design. For example, traditionally vehicles are designed with spaces within the chassis for installing various components within an interior section of the vehicle. Having a separate upper body portion 210 and lower body platform 200 allows access to the interior section of the vehicle before merging the upper body portion 210 and the lower body portion 200, which allows the vehicle to be more compactly designed. Further, advantageously, the upper body portion 210 and/or the lower body portion 200 may be more easily customized, such that different variants of upper body portions 210 (or features thereof) and lower body platform(s) 200 may be used in combination with each other.

Further, while the upper body manufacturing process 400 and the lower body platform manufacturing process 300 are illustrated as being completely performed in parallel, there may be aspects that may be performed in sequence and after merging the upper body portion 210 and the lower body platform 200. For example, the entire lower body platform manufacturing process 300 may be completely performed separately, whereas step 407 of the upper body portion manufacturing process 400 may be delayed until after step 501 (merging the lower body platform 200 and the upper body portion 210). Thus, step 407 (installation of interior in the upper body portion 210) may be performed after merging the lower body platform 200 with the upper body portion 210.

After merging the upper body portion 210 with the lower body platform 100 to form the vehicle, the upper body portion 210 and the lower body platform 200 may be aligned (step 502). Step 502 may be omitted depending on whether the upper body portion 210 and the lower body platform 200 are already aligned after merging in step 501. Further, the assembled vehicle may be tested (step 503). Testing may include but is not limited to mechanical and/or electrical testing. Notably, specific electrical systems within the upper body portion 210 may be tested separately from the lower body platform 200, although testing of some control systems and the like must necessarily involve testing cause-effect between the component(s) within the upper body portion 210 and those within the lower body platform 200. In some embodiments, step 503 may be wholly or partially omitted depending on whether specific testing is required or desirable.

Figure 6:
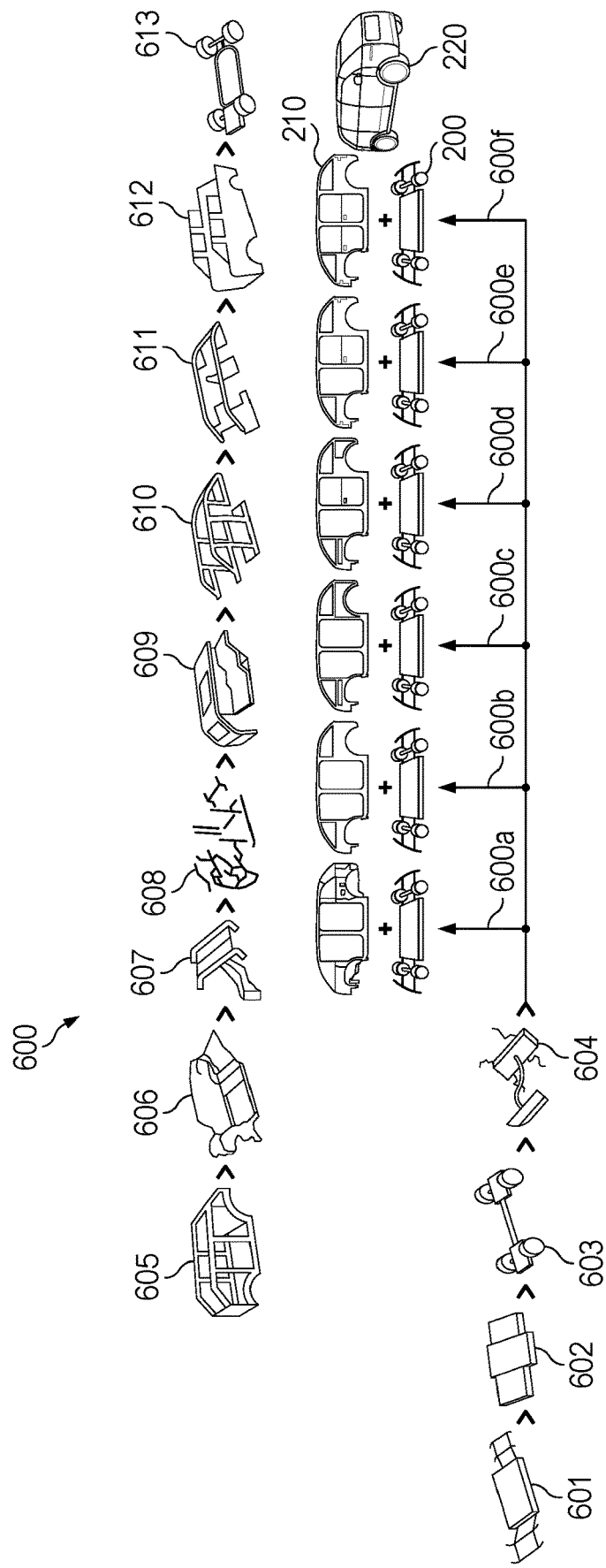
FIG. 6 illustrates in greater detail an exemplary embodiment of a process flow for EV manufacture according of embodiments of the present disclosure.

FIG. 6 illustrates in greater detail an exemplary embodiment of a process flow for EV manufacture according of embodiments of the present disclosure. The embodiment shown in FIG. 6 is for illustration and explanation only. FIG. 6 does not limit the scope of this disclosure to any particular implementation of EV manufacture, or exclude variants.

Similar to the process flow depicted in FIG. 1 and described in connection with FIGS. 3 through 5, the process flow 600 illustrates the upper body portion 210 and the lower body platform 200 being manufactured in parallel. As illustrated, the manufacturing of the lower body platform 200 begins with a lower body frame 601. Then various aspects are sequentially added to the lower body frame 601. These aspects include the energy storage system 602, the drivetrain and control components 603, and the thermal systems 604 (e.g., the drivetrain cooling system, the energy storage cooling and heating system, and the HVAC system). While these various aspects are illustrated as added in a specific order, these various aspects may be installed in a different order than illustrated. Further, various pieces of each system may be installed without the complete sub-system being installed before installation of another sub-system is initiated, such that any particular sub-system may be installed concurrently or in parallel with another sub-system.

As illustrated, the upper body portion 210 may be assembled in parallel. For example, an upper body frame 605 may be provided. Then various aspects may be sequentially added to the upper body frame 605. These aspects include the pre-trim 606, the marriage or merger preparation components 607, the trim 608 and 609, the interior 610, the seats 611, and the exterior(s) 612 and 613. While these various aspects are illustrated as added in a specific order, these various aspects may be installed in a different order than illustrated. Further, various pieces of each sub-system may be installed without the complete sub-system being installed. That sub-system may be installed concurrently or in parallel with the other sub-system.

As illustrated, at various manufacturing points 600a/600b/600c/600d/600e/600f the upper body portion 200 may be merged with the lower body portion 100. For example, the upper body portion 210 may be merged with the lower body platform 200. For example, the upper body portion 210 may be merged with the lower body platform 200 after the entire upper body portion 210 and lower body platform 200 have been assembled (point 600f). Advantageously, such timing may improve manufacturing throughput by allowing processes to be performed in parallel while allowing a more compactly designed upper body portion 210 and lower body platform 200. The upper body portion 210 may alternatively be merged with the lower body platform 100 before the complete assembly of the upper body portion 210 and/or the lower body platform 200. For example, as illustrated at point 600e, the upper body portion 210 may be merged with the lower body platform 100 after the seats 611 have been installed within the vehicle cabin. Then the exterior(s) 612 and 613 may be installed on the upper body portion 210 of the merged vehicle 220. While not illustrated, those skilled in the art will recognize that the lower body platform 200 may also be merged with the upper body portion 210 before the lower body platform 200 has been completely assembled. Assembly of the lower body platform 200 may be completed after the merger.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A manufacturing process for manufacturing an electric vehicle, the manufacturing process comprising:
    manufacturing an upper body portion by
        manufacturing a top hat including closures and exterior components formed of colored thermoplastic, and
        e-coating portions of the top hat;
    in parallel with the manufacturing and e-coating steps of manufacturing the upper body portion, manufacturing a lower body portion by
        providing a ladder frame for a skateboard platform, the ladder frame configured to enclose battery elements on sides of the battery elements,
        e-coating the ladder frame, and
        assembling the battery elements and other components of the skateboard platform with the ladder frame;
    merging the manufactured upper body portion and the manufactured lower body portion to form an assembled electric vehicle; and
    after merging the manufactured upper body portion and the manufactured lower body portion,
        aligning a chassis of the assembled electric vehicle, and
        performing end-of-production vehicle testing on the assembled electric vehicle and finishing of the assembled electric vehicle.

2. The manufacturing process of claim 1, wherein manufacturing the top hat further comprises:
    providing an upper body frame for the top hat;
    applying wiring harnesses to the upper body frame;
    applying body panels to the upper body frame;
    applying doors to the upper body frame;
    applying fittings to the upper body frame;
    applying heating, ventilation, and air conditioning (HVAC) ducts and vents to the upper body frame;
    applying glass to the upper body frame; and
    applying interior components to the upper body frame.

3. The manufacturing process of claim 1, wherein manufacturing the lower body portion comprises:
    providing the ladder frame;
    applying a drivetrain to the ladder frame;
    applying a control system to the ladder frame;
    applying a heating, ventilation, and air conditioning (HVAC) system to the ladder frame;
    applying a drivetrain cooling system to the ladder frame;
    applying an energy storage system including the battery elements to the ladder frame; and
    applying an energy storage heating and cooling system to the ladder frame.

4. The manufacturing process of claim 1, wherein merging the upper body portion and the lower body portion comprises:
    mechanically connecting the upper body portion and the lower body portion;
    connecting heating, ventilation, and air conditioning (HVAC) ducts of the lower body portion to HVAC ducts and vents of the upper body portion; and
    connecting wiring harnesses of the upper body portion to be in communication to at least one of a drivetrain or a control system of the lower body portion.

5. The manufacturing process of claim 1, wherein performing end-of-production vehicle testing on the assembled electric vehicle further comprises:
    testing cause-effect between controls within the upper body portion and components within the lower body portion.

6. The manufacturing process of claim 1, further comprising:
    e-coating at least one component of the closures for the electric vehicle.

7. The manufacturing process of claim 1, wherein no paint shop is utilized.

8. A manufacturing process for manufacturing an electric vehicle, the manufacturing process comprising:
    providing a ladder frame configured to enclose battery elements on sides of the battery elements;
    e-coating the ladder frame;
    assembling the battery elements with the e-coated ladder frame to form a skateboard platform;
    in parallel with at least e-coating the ladder frame and assembling the battery elements with the e-coated ladder frame, manufacturing a top hat including closures and exterior components formed of colored thermoplastic and e-coating portions of the top hat; and
    merging the skateboard platform and the top hat to form an assembled electric vehicle; and
    after merging the skateboard platform and the top hat,
        aligning a chassis of the assembled electric vehicle, and
        performing end-of-production vehicle testing on the assembled electric vehicle.

9. The manufacturing process of claim 8, wherein manufacturing the top hat comprises:
    providing an upper body frame for the top hat;
    applying wiring harnesses to the upper body frame;
    applying body panels to the upper body frame;
    applying doors to the upper body frame;
    applying fittings to the upper body frame;
    applying heating, ventilation, and air conditioning (HVAC) ducts and vents to the upper body frame;
    applying glass to the upper body frame; and
    applying interior components to the upper body frame.

10. The manufacturing process of claim 8, wherein manufacturing the skateboard platform comprises:
    providing the ladder frame;
    applying a drivetrain to the ladder frame;
    applying a control system to the ladder frame;
    applying a heating, ventilation, and air conditioning (HVAC) to the ladder frame;
    applying a drivetrain cooling system to the ladder frame;
    applying an energy storage system to the ladder frame; and
    applying an energy storage heating and cooling system to the ladder frame.

11. The manufacturing process of claim 8, wherein merging the skateboard platform and the top hat comprises:
    mechanically connecting the top hat and the skateboard platform;
    connecting heating, ventilation, and air conditioning (HVAC) ducts of the skateboard platform to HVAC ducts and vents of the top hat; and
    connecting one or more wiring harnesses of the top hat to a drivetrain of the skateboard platform and one or more wiring harnesses of the top hat to a control system of the skateboard platform.

12. The manufacturing process of claim 8, wherein performing end-of-production vehicle testing on the assembled electric vehicle further comprises:
    vehicle testing cause-effect between controls within the top hat and components within the skateboard platform.

13. The manufacturing process of claim 8, further comprising:
  e-coating at least one component of the closures for the electric vehicle.

14. The manufacturing process of claim 8, wherein no paint shop is utilized.

\* \* \* \* \*